United States Patent
Torai et al.

(10) Patent No.: US 11,730,165 B2
(45) Date of Patent: Aug. 22, 2023

(54) ORGAN CONTAINER

(71) Applicant: SCREEN HOLDINGS CO., LTD., Kyoto (JP)

(72) Inventors: Shinji Torai, Kyoto (JP); Hiroo Kasamatsu, Kyoto (JP); Syuhei Yoshimoto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 260 days.

(21) Appl. No.: 16/933,316

(22) Filed: Jul. 20, 2020

(65) Prior Publication Data

US 2021/0022334 A1 Jan. 28, 2021

(30) Foreign Application Priority Data

Jul. 24, 2019 (JP) .................................. 2019-135914

(51) Int. Cl.
*A01N 1/02* (2006.01)

(52) U.S. Cl.
CPC ......... *A01N 1/0247* (2013.01); *A01N 1/0284* (2013.01)

(58) Field of Classification Search
CPC ........................... A01N 1/0284; A01N 1/0247
See application file for complete search history.

(56) References Cited

U.S. PATENT DOCUMENTS

| 5,157,930 A | 10/1992 | McGhee et al. |
| 2003/0073226 A1 | 4/2003 | Wood et al. |
| 2008/0286746 A1 | 11/2008 | Poo et al. |
| 2011/0076666 A1 | 3/2011 | Brassil |
| 2014/0017770 A1 | 1/2014 | Steinman et al. |
| 2020/0308520 A1 | 10/2020 | Torai et al. |

FOREIGN PATENT DOCUMENTS

| JP | 03-151303 A | 6/1991 |
| JP | 2015-525760 A | 9/2015 |
| JP | 2019-043939 A | 3/2019 |
| JP | 2019-094315 A | 6/2019 |
| WO | 02/26034 A2 | 4/2002 |

OTHER PUBLICATIONS

Extended European Search Report issued in corresponding European Patent Application No. 20187104.3-1122, dated Dec. 23, 2020.
Notice of reasons for refusal dated Jun. 20, 2023 of Japanese Patent Application No. JP 2019-135914, and English Translation.

*Primary Examiner* — Anoop K Singh
*Assistant Examiner* — Suzanne E Ziska
(74) *Attorney, Agent, or Firm* — McDermott Will & Emery LLP

(57) ABSTRACT

An organ container includes a bottomed tubular outer container and a bottomed tubular inner container that is fitted into the outer container. A fluid flow path is formed between an outer peripheral surface of the inner container and an inner peripheral surface of the outer container. The outer container has an inlet that communicates between the fluid flow path and the outside, and an outlet that communicates between the fluid flow path and the outside.

4 Claims, 4 Drawing Sheets

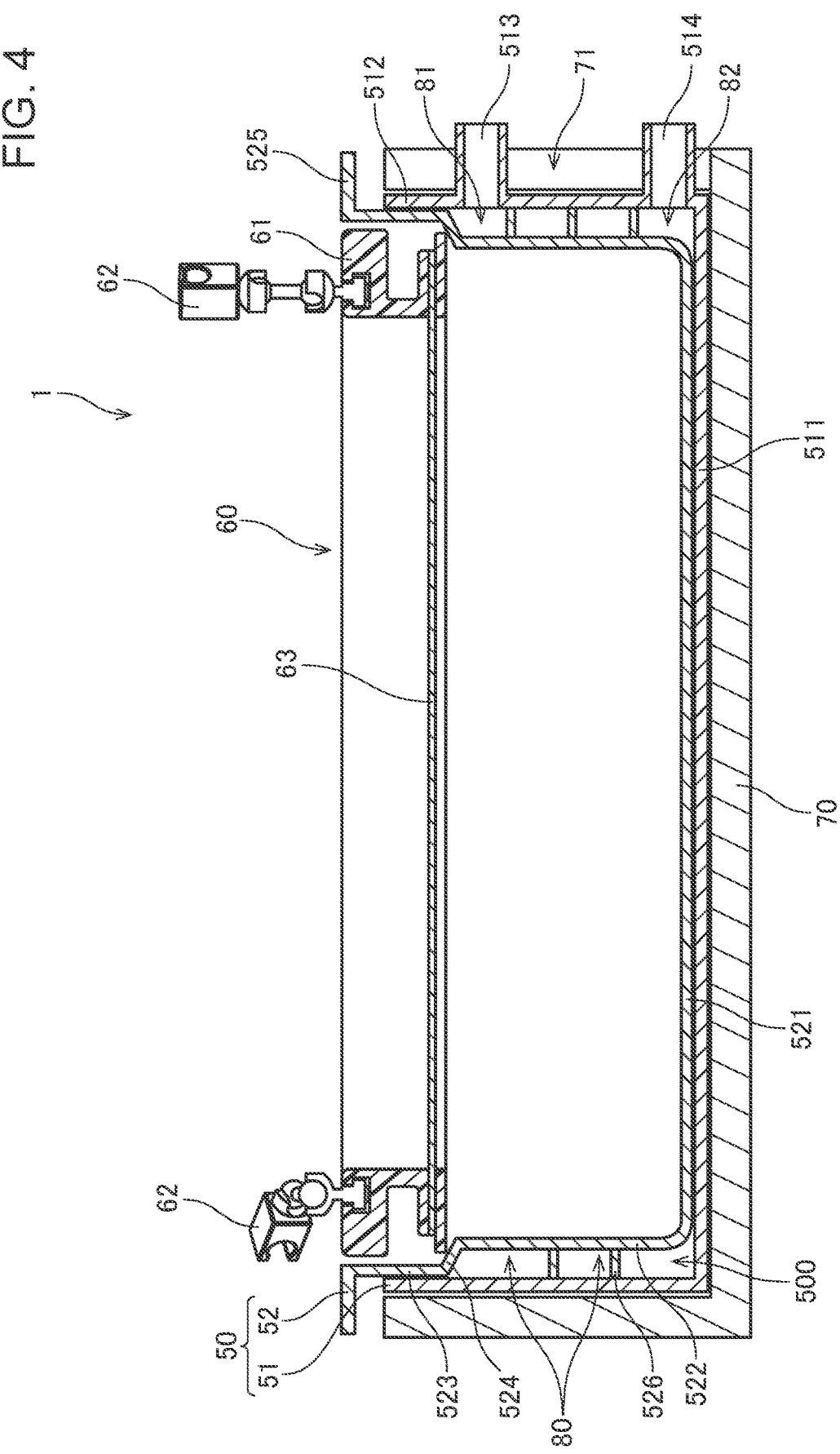

ORGAN CONTAINER

RELATED APPLICATIONS

This application claims the benefit of Japanese Application No. 2019-135914, filed on Jul. 24, 2019, the disclosure of which is incorporated by reference herein.

BACKGROUND OF THE INVENTION

Field of the Invention

The present invention relates to an organ container for accommodating an organ during perfusion preservation of the organ.

Description of Background Art

In organ transplant operations such as liver transplantation, an organ is temporarily preserved during the period from when the organ is removed from the donor to when the organ is transplanted into the recipient. Various preservation methods and perfusion methods have been developed in order to preserve isolated organs in transplantable conditions. In order to preserve isolated organs, for example, a simple cooling method is known in which blood in an organ is replaced with a low-temperature organ preservation solution in order to suppress cell metabolism, and then the organ is immersed in a low-temperature preservation solution. There is also known a perfusion preservation method in which the vascular network of a preserved organ is perfused with a preservation solution for the purpose of eliminating waste materials in the organ.

For example, Japanese Patent Application Laid-Open No. H03-151303 describes a conventional device for in vitro perfusion preservation of an organ.

In the device described in Japanese Patent Application Laid-Open No. H03-151303, an organ held by a hammock made of a hydrophobic cloth is accommodated in an organ preservation chamber. In this device, the organ preservation chamber and a reservoir for storing perfusate are housed in a cool container for cold insulation.

In the case of perfusion preservation, it is preferable to regulate the temperature of an organ to, for example, 4° C., 20° C., or 37° C. depending on the purpose. It is, however, difficult for a cold/heat reserving mechanism, such as the device described in Japanese Patent Application Laid-Open No. H03-151303, to maintain an appropriate temperature for long hours.

SUMMARY OF THE INVENTION

It is an object of the present disclosure to provide a technique with which the temperature of an organ can be appropriately regulated during perfusion preservation of the organ.

An organ container accommodates an organ during perfusion preservation of the organ. The organ container includes an outer container having a bottomed tubular shape, and an inner container having a bottomed tubular shape and fitted into the outer container. A fluid flow path is formed between an outside face of the inner container and an inside face of the outer container. The outer container includes an inlet that communicates between the fluid flow path and an outside, and an outlet that communicates between the fluid flow path and the outside.

This enables appropriately regulating the temperature of an organ with a simple configuration.

Preferably, the fluid flow path is arranged in a spiral shape from the inlet to the outlet along an outer peripheral surface of the inner container.

Almost the entire space between the inner container and the outer container can be utilized as the fluid flow path. This improves the efficiency of heat exchange between a temperature regulating fluid in the fluid flow path and a liquid in the inner container.

Preferably, a cylindrical internal space is formed between the outside face of the inner container and the inside face of the outer container. The fluid flow path is a space connecting the outside face and the inside face and partitioned by a plate-like boundary plate arranged in a spiral shape.

Preferably, the organ container further includes an organ holder arranged inside the inner container and on which the organ is placed. The organ holder includes a ring-shaped frame, and a placement sheet that is mounted on the frame and on which the organ is placed.

Accordingly, the organ can be held appropriately.

Preferably, the organ container further includes a heat insulator that covers a periphery of the outer container.

This enables maintaining the temperatures of a liquid and an organ accommodated inside the container.

These and other objects, features, aspects and advantages of the present invention will become more apparent from the following detailed description of the present invention when taken in conjunction with the accompanying drawings.

BRIEF DESCRIPTION OF DRAWINGS

FIG. 4 is a sectional view of the organ container according to the first embodiment.

DESCRIPTION OF PREFERRED EMBODIMENTS

An embodiment of the present invention will be described hereinafter with reference to the drawings. In the present application, donors and recipients may be humans, or may be non-human animals. That is, "organs" including "livers" according to the present application may be human organs, or may be organs of non-human animals. The non-human animals may be rodents such as mice and rats, ungulates such as pigs, goats, and sheep, non-human primates such as chimpanzees, or other non-human mammals, or may be nonmammalian animals.

1. First Embodiment

1-1. Configuration of Perfusion Device

Figure 1:
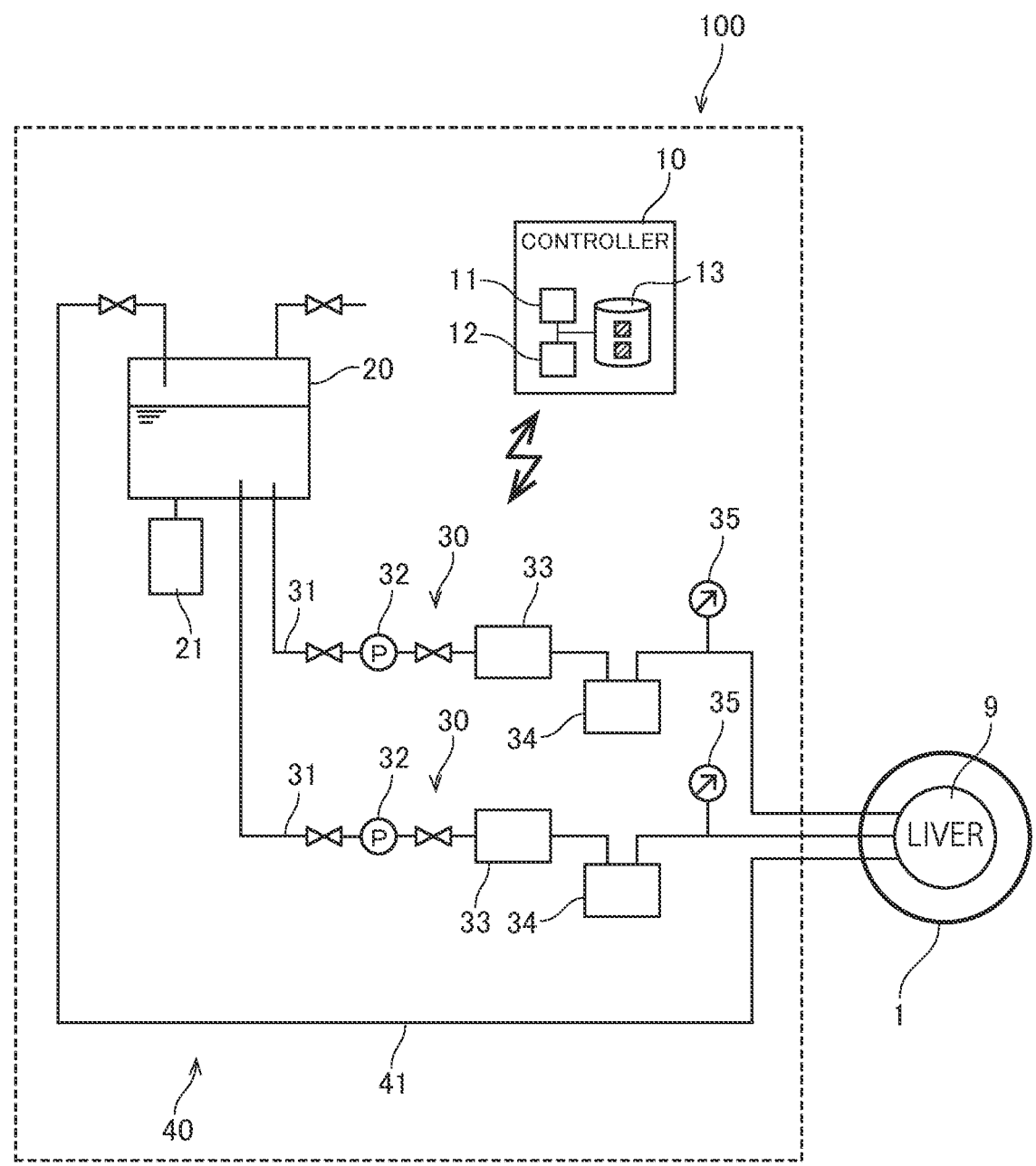
FIG. 1 is a schematic diagram illustrating a configuration of a perfusion device according to a first embodiment.

A case in which an organ reactor 1 according to a first embodiment of the present invention is used together with a perfusion device 100 will be described with reference to FIG. 1. FIG. 1 is a schematic view illustrating a configuration of the perfusion device 100.

The perfusion device 100 is a device for temporarily preserving an organ such as a liver removed from a donor outside the body until when the organ is transplanted into a recipient. The perfusion device 100 performs perfusion while supplying perfusate to the organ. The following description is given of the case where a liver 9 is taken as an example of the organ subjected to perfusion treatment.

In the case of perfusion treatment using the perfusion device 100, the liver 9 is held and accommodated in the organ reactor 1. The organ reactor 1 is one embodiment of the "organ container" for accommodating an organ during perfusion preservation of the organ. The organ reactor 1 accommodates therein the liver 9 held by an organ holder 60, which will be described later, and a liquid such as a preservation solution. A detailed configuration of the organ reactor 1 will be described later.

As illustrated in FIG. 1, the perfusion device 100 includes a reservoir 20, two (two-line) perfusate inflow parts 30, a perfusate outflow part 40, and a controller 10. The number of perfusate inflow parts 30 and the number of perfusate outflow parts 40 may be one (one line) or may be a multiple number (multiple lines) depending on perfusion conditions or the type of an organ to be perfused.

The reservoir 20 is a container for storing perfusate. A gas exchange mechanism 21 is provided around the reservoir 20. In the present embodiment, the perfusate is an ETK solution. Alternatively, the perfusate may be any other type of perfusate such as an UW solution.

The gas exchange mechanism 21 supplies a gas such as oxygen to the perfusate stored in the reservoir 20 to dissolve the gas in the perfusate. The gas exchange mechanism 21 may be interposed in inflow tubes 31, which will be described later, of the perfusate inflow parts 30.

The perfusate inflow parts 30 supply the perfusate from the reservoir 20 to the liver 9. Each perfusate inflow part 30 includes the inflow tube 31, a pump 32, a temperature regulating unit 33, a deaerating unit 34, and a pressure gauge 35. The pump 32, the temperature regulating unit 33, the deaerating unit 34, and the pressure gauge 35 are interposed in the inflow tube 31.

The inflow tubes 31 are connected at their one ends to the reservoir 20. The inflow tubes 31 are also connected at their other ends to an organ to be perfused during perfusion treatment. In the present embodiment, the other ends of the inflow tubes 31 are connected to blood vessels of the liver 9. This allows the perfusate to be supplied from the reservoir 20 to the blood vessels of the liver 9.

In the case where the perfusate is supplied from the two-line perfusate inflow parts 30 to the liver 9 as in the present embodiment, one of the inflow tubes 31 is connected to the portal vein of the liver 9, and the other inflow tube 31 is connected to the hepatic artery of the liver 9. In a liver of a living body, blood is supplied from the portal vein and the hepatic artery. The hepatic artery is an arterial blood vessel, so that the blood in the hepatic artery has a high pressure. In contrast, the portal vein is a venous blood vessel, so that the blood in the portal vein has an extremely lower pressure than the pressure of the blood in the hepatic artery. The two-line perfusate inflow parts 30 in the perfusion device 100 enable individually setting the pressure of the perfusate supplied to the hepatic artery and the pressure of the perfusate supplied to the portal vein.

The pumps 32 produce the flows of the perfusate from the reservoir 20 to the liver 9 in the inflow tubes 31. For example, a pump equipped with a brushless motor is used as each pump 32. The temperature regulating units 33 regulate the temperatures of the perfusate in the inflow tubes 31. For example, each temperature regulating unit 33 regulates the temperature of the perfusate in the inflow tube 31 to a set temperature of, for example, 4° C., 20° C., or 37° C. by immersing part of the inflow tube 31 in a liquid having the set temperature. The deaerating units 34 remove gas components in the perfusate flowing in the inflow tubes 31. The pressure gauges 35 measure the pressures of the perfusate in the inflow tubes 31.

The perfusate outflow part 40 drains the perfusate from the liver 9. The perfusate outflow part 40 includes an outflow tube 41. The outflow tube 41 is connected at its one end to an organ to be perfused during perfusion treatment. In the present embodiment, the outflow tube 41 is connected to the suprahepatic inferior vena cava (SH-IVC) or infrahepatic inferior vena cava (IH-IVC) of the liver 9. The outflow tube 41 is also connected at its other end to the reservoir 20. This allows the perfusate drained from the suprahepatic inferior vena cava (SH-IVC) or infrahepatic inferior vena cava (IH-IVC) of the liver 9 to flow back into the reservoir 20. Alternatively, a pump that produces the flow of perfusate from the liver 9 to the reservoir 20 may be interposed in the outflow tube 41.

The perfusion device 100 according to the present embodiment is configured to cause the perfusate drained from the liver 9 to flow back into the reservoir 20, but the present invention is not limited to this configuration. The perfusate drained from the liver 9 may be disposed of or stored in another container, instead of flowing back into the reservoir 20.

Note that each of the reservoir 20, the perfusate inflow parts 30, and the perfusate outflow part 40 may include a measuring unit for detecting a pH or a specific component under appropriate conditions. As another alternative, other devices such as a flowmeter or a solenoid valve for controlling communication may be interposed in the inflow tubes 31 and the outflow tube 41.

The controller 10 is a unit for controlling operations of each component of the perfusion device 100. As schematically illustrated in FIG. 1, the controller 10 is configured as, for example, a computer that includes an arithmetic processor 11 such as a CPU, a memory 12 such as a RAM, and a storage 13 such as a hard disk drive.

In the case of using this perfusion device 100 in perfusion treatment, even if the perfusate with its temperature regulated by the temperature regulating unit 33 is supplied to the liver 9, it will be difficult to maintain the liver 9 in good preservation conditions if the temperature of the liver 9 itself is not appropriately regulated depending on the environments of the organ reactor 1 in which the liver 9 is accommodated. In view of this, the perfusion device 100 according to the present embodiment causes the organ reactor 1 to provide efficient temperature regulation so as to appropriately regulate the temperature of an organ accommodated in the organ reactor 1.

1-2. Configuration of Organ Reactor

Figure 2:
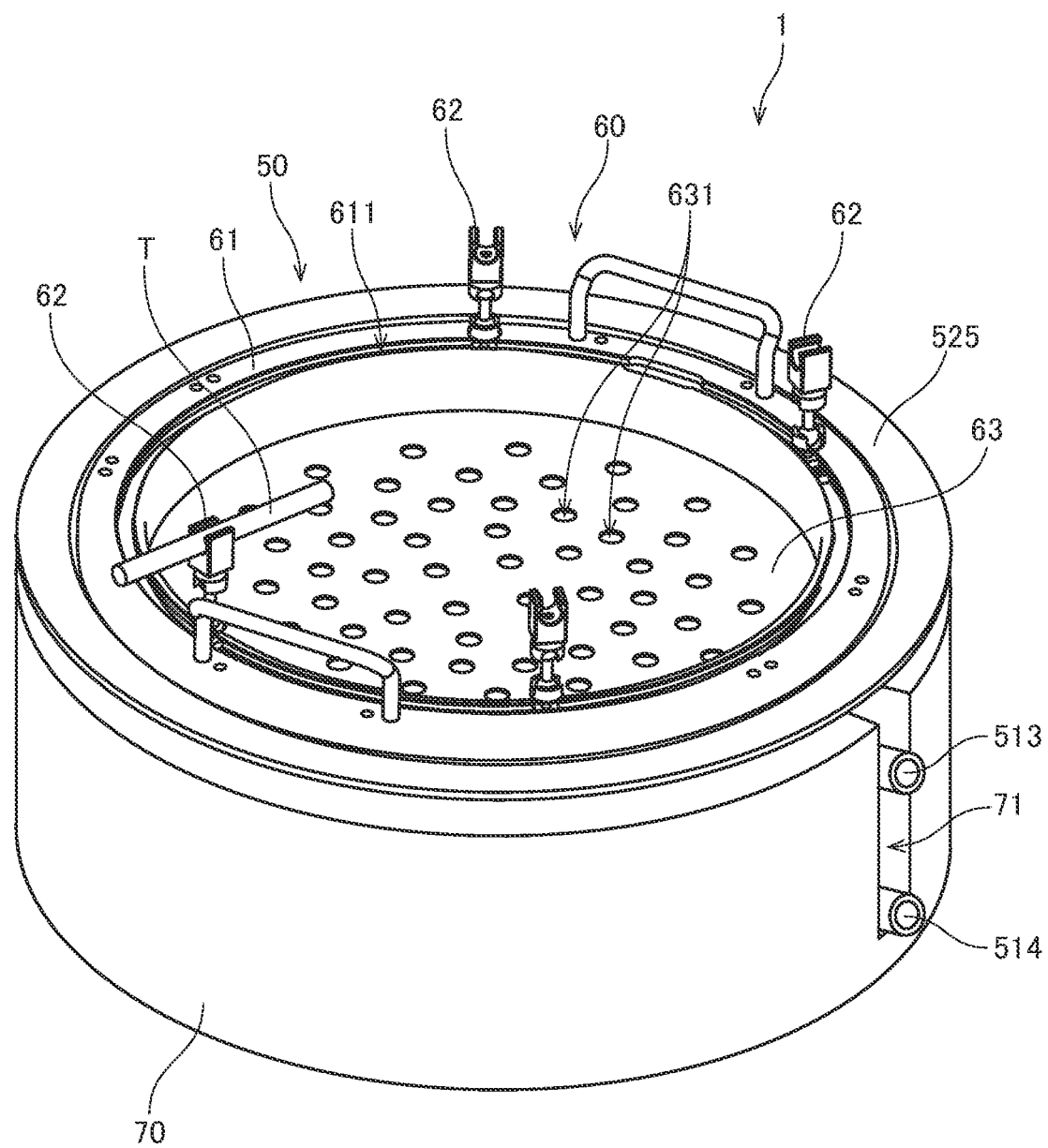
FIG. 2 is a perspective view of an organ container according to the first embodiment.
Figure 3:
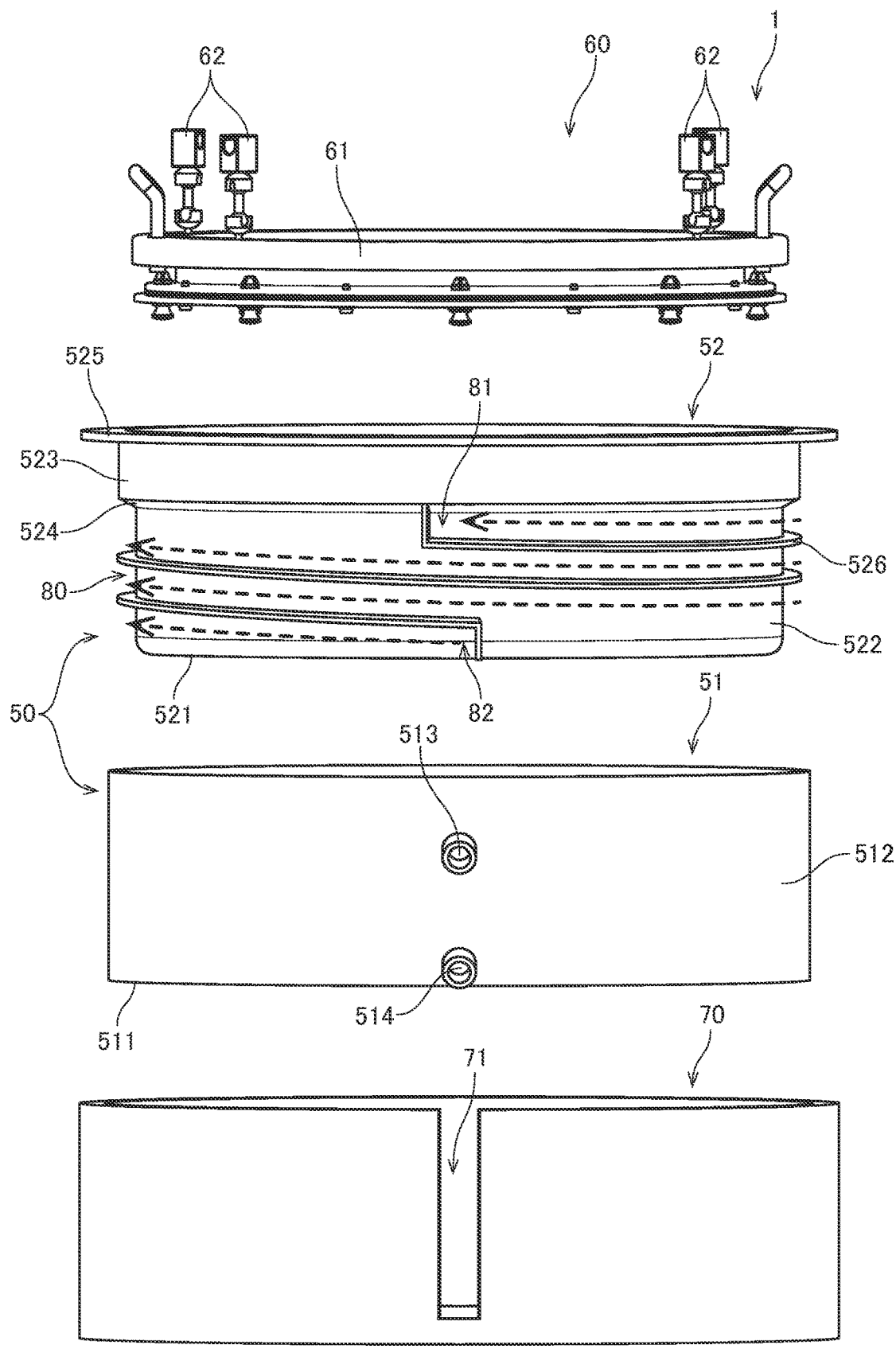
FIG. 3 is an exploded perspective view of the organ container according to the first embodiment.

Next, the organ reactor 1 according to the first embodiment of the present invention will be described with reference to FIGS. 2 to 4. FIG. 2 is a perspective view of the organ reactor 1. FIG. 3 is an exploded perspective view of the organ reactor 1. FIG. 4 is a sectional view of the organ reactor 1. In FIG. 4, some tube clamp parts 62, which will be described later, are illustrated in a side view, not in a sectional view.

As illustrated in FIGS. 2 to 4, the organ reactor 1 includes a reactor body 50, an organ holder 60, and a heat insulator 70.

The reactor body 50 is a container for accommodating therein an organ to be perfused and a liquid such as a preservation solution. As illustrated in FIGS. 3 and 4, the reactor body 50 includes an outer container 51 and an inner container 52.

The outer container 51 is a bottomed tubular container. The outer container 51 is made of metal, for example. The outer container 51 has a bottom 511, an outer wall 512, a first inlet/outlet 513, and a second inlet/outlet 514.

The bottom 511 is a plate-like portion that extends generally horizontally. The outer wall 512 is a tubular portion that extends upward from the edge of the bottom 511. The first inlet/outlet 513 and the second inlet/outlet 514 each communicate between the inside of the outer wall 512 and the outside thereof. Both of the first inlet/outlet 513 and the second inlet/outlet 514 according to the present embodiment have a cylindrical shape.

The inner container 52 is a bottomed tubular container that is fitted into the outer container 51. The inner container 52 is made of, for example, a material having high thermal conductivity such as metal. The inner container 52 has a bottom 521, a first wall 522, a second wall 523, a connection wall 524, a flange 525, and a boundary plate 526.

The bottom 521 is a plate-like portion that extends generally horizontally. The bottom 521 according to the present embodiment has a disk-like shape. The first wall 522 is a tubular portion that extends upward from the edge of the bottom 521. The second wall 523 is a tubular portion arranged above the first wall 522. The second wall 523 has a diameter greater than the diameter of the first wall 522. That is, the second wall 523 is arranged outward of the first wall 522 when viewed in the up-down direction.

The connection wall 524 is a portion that connects the upper end of the first wall 522 and the lower end of the second wall 523. In the present embodiment, the lower end of the second wall 523 is arranged above the upper end of the first wall 522. Thus, the connection wall 524 is tapered in a circular truncated cone shape having a greater diameter toward the top. Alternatively, the lower end of the second wall 523 may be arranged at the same level as the upper end of the first wall 522, and the connection wall 524 may have a shape extending generally horizontally.

The flange 525 extends generally horizontally in a ring shape from the upper end of the second wall 523 toward the outside. The boundary plate 526 will be described later.

The bottom 521, the first wall 522, at least part of the second wall 523, the connection wall 524, and the boundary plate 526 are arranged inside the outer container 51. At this time, the inner peripheral surface of the outer wall 512 of the outer container 51 and the outer peripheral surface of the second wall 523 of the inner container 52 come in contact with each other.

The inner peripheral surface of the outer wall 512 of the outer container 51 and the outer peripheral surface of the first wall 522 of the inner container 52 are arranged with an interval provided therebetween. This forms a tubular internal space 500 between the inner peripheral surface of the outer wall 512 and the outer peripheral surface of the first wall 522. In the present embodiment, since the inner peripheral surface of the outer wall 512 and the outer peripheral surface of the first wall 522 both have a cylindrical shape, the internal space 500 also has a cylindrical shape.

The boundary plate 526 is a plate-like portion that extends from the first outer wall of the inner container 52 toward the outside, as illustrated in FIGS. 3 and 4. The boundary plate 526 is arranged in a spiral shape along the outer peripheral surface of the first wall 522 of the inner container 52. When the inner container 52 is fitted into the outer container 51, the outer edge of the boundary plate 526 may come in contact with the inner peripheral surface of the outer wall 512, or may oppose the inner peripheral surface of the outer wall 512 with a slight space provided therebetween. Thus, the boundary plate 526 partitions the internal space 500 into a space extending in a spiral shape. This spirally extending space forms a fluid flow path 80. That is, the fluid flow path 80 is formed between the inner peripheral surface of the outer container 51 and the outer peripheral surface of the inner container 52.

When the organ reactor 1 is used, a temperature regulating liquid is supplied into the fluid flow path 80 to produce a flow of liquid. Examples of the temperature regulating fluid include tap water and a liquid having a higher viscosity and higher heat retaining properties than water.

In the following description, one end of the fluid flow path 80 is referred to as a first end 81, and the other end of the fluid flow path 80 is referred to as a second end 82. In the present embodiment, the first end 81 is arranged at the upper end of the internal space 500, and the second end 82 is arranged at the lower end of the internal space 500. The fluid flow path 80 extends from the first end 81 down to the second end 82 in a spiral shape along the outer peripheral surface of the first wall 522.

The first inlet/outlet 513 of the outer container 51 is arranged at a position overlapping approximately with the position of the first end 81 of the fluid flow path 80. Thus, the first inlet/outlet 513 communicates between the fluid flow path 80 and the outside. The second inlet/outlet 514 is arranged at a position overlapping approximately with the position of the second end 82 of the fluid flow path 80. Thus, the second inlet/outlet 514 communicates between the fluid flow path 80 and the outside.

In this way, in the present embodiment, the first inlet/outlet 513 is arranged above the second inlet/outlet 514. Then, the second inlet/outlet 514 is used as an inlet through which a fluid is supplied from the outside into the fluid flow path 80. The first inlet/outlet 513 is used as an outlet through which a fluid is discharged from the fluid flow path 80 to the outside.

The organ holder 60 is arranged at least in part inside the inner container 52 and places and holds an organ thereon. The organ holder 60 includes a frame 61, tube clamp parts 62, and a placement sheet 63. As illustrated in FIG. 4, the organ holder 60 is arranged inward of the second wall 523 of the inner container 52.

The frame 61 is a ring-shaped member on which the tube clamp parts 62 and the placement sheet 63 can be mounted.

The tube clamp parts 62 hold tubes such as inflow piping 31 and outflow piping 41 that are connected to an organ held by the organ holder 60. In FIG. 2, part of a tube held by one tube clamp part 62 is illustrated as a tube T. The positions at which the tube clamp parts 62 are mounted may be changed along a groove 611 provided in the upper face of the frame 61. Thus, each tube connected to an organ can be fixed at an appropriate position by the tube clamp part 62 mounted on the frame 61 arranged around the organ. This stabilizes the relative positions of the organ and the tube. As a result, it is possible to reduce the load on the organ and damage to the organ.

The placement sheet 63 is a member for holding an organ, the sheet being mounted on the frame 61 and having an upper face on which the organ is placed. The placement sheet 63 is formed of, for example, a resin having an elastic force or non-woven fabric. The type and number of placement sheets 63 mounted on the frame 61 may be appropriately selected depending on, for example, the type of an organ to be held and the purpose of preserving an organ. For example, two types of overlaid placement sheets 63 may be used.

The present embodiment adopts a flat placement sheet 63. When no organ is placed on the placement sheet 63, the placement sheet 63 is flat as illustrated in FIG. 4. When the organ reactor 1 is used, an organ is placed on the placement sheet 63. In this case, the central portion of the placement sheet 63 becomes bowed downward in a bowl-like shape by the weight of the organ. The degree of deformation of the placement sheet 63 varies depending on the material of the placement sheet 63 or the weight of an organ.

The placement sheet 63 according to the present embodiment has a plurality of through holes 631. Thus, a liquid can move between upper and lower sides of the placement sheet 63 through the though holes 631. Accordingly, if the organ holder 60 with the placement sheet 63 mounted on the frame 61 is set in the organ reactor 1, the organ placed on the placement sheet 63 can be immersed in a liquid that fills the inside of the organ reactor 1. Note that not the entire organ has to be immersed in a liquid such as a preservation solution. It is sufficient that at least a lower part of the organ be immersed in a liquid.

The organ holder 60 does not necessarily have to be used when the organ reactor 1 is used. In that case, an organ may be wrapped by sterilized gauze or other materials and accommodated directly inside the reactor body 50. As another alternative, another form of organ holding container may be arranged in the reactor body 50. As yet another alternative, an organ holder 60 with no placement sheet 63 mounted thereon may be used when the organ reactor 1 is used. In that case, the organ holder 60 may be used for the purpose of holding a tube connected to an organ, instead of being used for the purpose of holding an organ.

In the present embodiment, the frame 61 and the tube clamp parts 62 of the organ holder 60 are both formed of heat-resistant resins. Examples of the heat-resistant resins include polycarbonate, polypropylene, and polytetrafluoroethylene (PTFE). In this way, using the frame 61 formed of a heat-resistant material enables sterilization of the frame 61.

The heat insulator 70 is formed in a bottomed tubular shape. The heat insulator is formed of foam plastic, for example. The heat insulator 70 covers the most part of the outer peripheral surface of the outer container 51, thereby keeping the temperature of the reactor body 50 and the temperatures of the liquid and the organ housed in the reactor body 50. The heat insulator 70 has a notch 71 extending downward from the upper end. The circumferential position of the notch 71 overlaps with the circumferential positions of the first inlet/outlet 513 and the second inlet/outlet 514. Thus, the ends of the first inlet/outlet 513 and the second inlet/outlet 514 are exposed from the heat insulator 70.

When the organ reactor 1 is used, the second inlet/outlet 514 is connected to a mechanism for supplying the temperature regulating fluid, and the first inlet/outlet 513 is connected to a mechanism for collecting the temperature regulating fluid. Then, the inner container 52 is filled with a liquid such as a preservation solution, and the temperature regulating fluid whose temperature has been regulated to a desired temperature is supplied into the fluid flow path 80 provided in the internal space 500.

This allows the temperature of the liquid that fills the inside of the inner container 52 to approach the temperature of the temperature regulating fluid in the fluid flow path 80. By continuing the supply of the temperature regulating fluid into the fluid flow path 80, the temperature of the liquid in the inner container 52 is kept at the desired temperature.

In the state in which the temperature of the liquid in the inner container 52 is stabilized, an organ is placed on the placement sheet 63 of the organ holder 60. Accordingly, it is possible to stably manage the temperature of the organ accommodated in the organ reactor 1.

The organ reactor 1 includes the reactor body 50 including a dual-structure of the outer container 51 and the inner container 52. The internal space 500 between the outer container 51 and the inner container 52 is used as the fluid flow path 80 along which the temperature regulating fluid flows. Accordingly, the temperature of the liquid in the inner container 52 can be appropriately regulated with a simple configuration. That is, the temperature of the organ accommodated in the organ reactor 1 can be appropriately regulated with a simple configuration.

In the present embodiment, the fluid flow path 80 is formed in a spiral shape along the outer peripheral surface of the first wall 522 of the inner container 52. Thus, almost the entire internal space 500 can be used as the fluid flow path 80. This improves the efficiency of heat exchange between the temperature regulating fluid in the fluid flow path 80 and the liquid in the inner container 52.

2. Variations

While an embodiment of the present invention has been described thus far, the present invention is not intended to be limited to the embodiment described above.

In the above-described embodiment, the organ reactor as a whole has a bottomed cylindrical shape, but the present invention is not limited thereto. For example, the organ reactor may have a polygonal shape such as a square or a hexagon as viewed from above, or may have any other shape such as an oval.

In the above-described embodiment, the inlet and outlet of the temperature regulating fluid are provided on the side of the outer container, but the present invention is not limited thereto. Either or both of the inlet and the outlet of the temperature regulating fluid may be provided at the top of the outer container or at the bottom thereof.

In the above-described embodiment, the inlet of the temperature regulating fluid is arranged below the outlet of the temperature regulating fluid, but the present invention is not limited thereto. The positional relationship between the inlet and outlet of the temperature regulating fluid may be appropriately changed.

While the invention has been shown and described in detail, the foregoing description is in all aspects illustrative and not restrictive. It is therefore understood that numerous modifications and variations can be devised without departing from the scope of the invention.

What is claimed is:

1. An organ container for accommodating an organ during perfusion preservation of said organ, the organ container comprising:
    an outer container having a bottomed tubular shape; and
    an inner container having a bottomed tubular shape and fitted into said outer container,
    wherein a fluid flow path is formed between an outside face of said inner container and an inside face of said outer container,
    wherein said outer container includes:
        an inlet that communicates between said fluid flow path and an outside; and an outlet that communicates between said fluid flow path and the outside, wherein one of said inlet and said outlet is arranged closer to a bottom of said outer container than another of said inlet and said outlet, wherein said fluid flow path extends from said inlet to said outlet along an outer peripheral surface of said inner container, wherein a plate-like boundary plate is arranged between said outside face of said inner container and said inside face of said outer container in a spiral shape such that said plate-like boundary plate extends along said outer peripheral surface of said inner container from said inlet to said outlet of said outer container in a screw-thread manner, and wherein said plate-like boundary plate extends from a top portion of the one of said inlet and said outlet arranged closer to said bottom of said outer container to a bottom portion of the another of said inlet and said outlet in the screw-thread manner to define said fluid flow path extending from said inlet to said outlet along said outer peripheral surface of said inner container.

2. The organ container according to claim 1, wherein a cylindrical internal space is formed between said outside face of said inner container and said inside face of said outer container, and said fluid flow path is a space connecting said outside face and said inside face and partitioned by said plate-like boundary plate.

3. The organ container according to claim 1, further comprising:

an organ holder arranged inside said inner container and on which said organ is placed, said organ holder including:

a ring-shaped frame; and a placement sheet that is mounted on said frame and on which said organ is placed.

4. The organ container according to claim 1, further comprising:

a heat insulator that covers a periphery of said outer container.

* * * * *